(12) United States Patent
Peterson

(10) Patent No.: US 7,574,978 B1
(45) Date of Patent: Aug. 18, 2009

(54) METHOD OF MAKING A DOG TRAINING APPARATUS AND THE APPARATUS THEREOF

(76) Inventor: Chris R. Peterson, 604 Grand Ave., Harrisburg, SD (US) 57032

( * ) Notice: Subject to any disclaimer, the term of this patent is extended or adjusted under 35 U.S.C. 154(b) by 305 days.

(21) Appl. No.: 11/551,102

(22) Filed: Oct. 19, 2006

(51) Int. Cl.
*A01K 29/00* (2006.01)

(52) U.S. Cl. ........................................ 119/709; 119/711
(58) Field of Classification Search ................ 119/709, 119/711, 707, 712; 43/2
See application file for complete search history.

(56) References Cited

U.S. PATENT DOCUMENTS

| | | | | |
|---|---|---|---|---|
| 4,907,537 A | * | 3/1990 | Shirk | 119/707 |
| 5,199,204 A | * | 4/1993 | Lowery | 43/2 |
| 5,706,762 A | * | 1/1998 | Dokken | 119/712 |
| 6,681,721 B1 | | 1/2004 | Buschy | |
| 6,708,649 B1 | * | 3/2004 | Lalor | 119/709 |
| 6,840,197 B1 | * | 1/2005 | Trompke | 119/711 |
| D517,752 S | * | 3/2006 | Byrne | D30/160 |
| D544,155 S | * | 6/2007 | Lamstein et al. | D30/160 |
| 2002/0123295 A1 | * | 9/2002 | Spector | 446/268 |

* cited by examiner

*Primary Examiner*—Yvonne R. Abbott

(57) ABSTRACT

A method of making a dog training apparatus includes providing a housing that has a first end and a second end. A well extends into the first end. A sleeve is mounted in the well. The sleeve has an open end directed outwardly of the well. A removable cover covers the open end. The cover includes an outer wall and a peripheral wall attached to the outer wall. The outer wall has a plurality of apertures extending therethrough. A plurality of feathers is provided and each includes a quill having a free end. Each of the free ends extends through one of the apertures so that the feathers extend away from the sleeve when the cover is positioned on the sleeve. An adhesive secures each of the quills to the cover. A container has a size and shape configured to be removably positionable in the sleeve. A fluidic game scent positioned in the container. The container is positioned in the sleeve.

20 Claims, 5 Drawing Sheets

METHOD OF MAKING A DOG TRAINING APPARATUS AND THE APPARATUS THEREOF

BACKGROUND OF THE INVENTION

1. Field of the Invention

The present invention relates to dog training devices and more particularly pertains to a new dog training device for assisting a trainer in teaching a dog to track, locate and retrieve a game bird.

2. Description of the Prior Art

The use of dog training devices is known in the prior art. While these devices fulfill their respective, particular objectives and requirements, the need remains for a device which can be thrown by a trainer so that a hunting dog can chase, find and retrieve the device. The device should include means for mounting feathers of a game bird thereon to increase the desire of the hunting dog in finding the device. Further, as hunting dogs often rely on scent, the device should include storage means for retaining a vial of liquid scent which may be rubbed or poured onto the device or feathers as needed. The storage means will ensure that the trainer always has convenient access to the scent.

SUMMARY OF THE INVENTION

The present invention meets the needs presented above by generally providing a housing that has a first end and a second end. A well extends into the first end. A sleeve is mounted in and extends outwardly from the well. The sleeve has a closed end positioned within the well and an open end directed outwardly of the well. A cover is removably positioned on and covers the open end of the sleeve. The cover includes an outer wall and a peripheral wall attached to the outer wall. The outer wall has a plurality of apertures extending therethrough. A plurality of feathers is provided and each includes a quill having a free end. Each of the free ends extends through one of the apertures so that the feathers extend away from the sleeve when the cover is positioned on the sleeve. An adhesive secures each of the quills to the cover. A container has a size and shape configured to be removably positionable in the sleeve. A fluidic game scent positioned in the container. The container is positioned in the sleeve.

The present invention further meets the needs presented above by generally comprising a housing having a first end and a second end. A well extends into the first end. A sleeve is mounted in and extends outwardly from the well. The sleeve has a closed end positioned within the well and an open end directed outwardly of the well. A cover is removably positioned on and covers the open end of the sleeve. A plurality of feathers each is attached to the cover. A container is removably positioned in the sleeve. A fluidic game scent is positioned in the container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
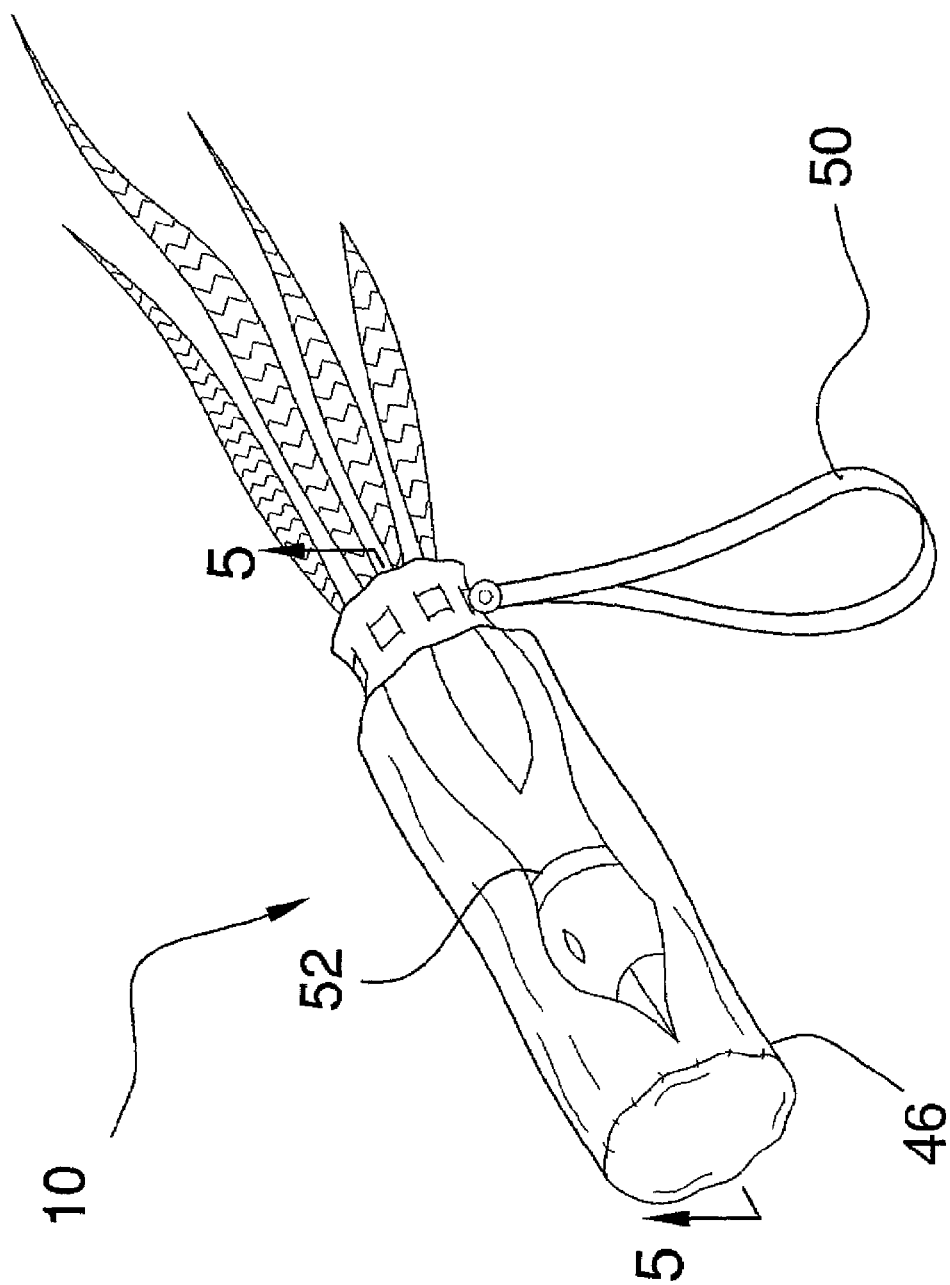
FIG. 1 is a perspective view of a method of making a dog training apparatus and the apparatus thereof according to the present invention.
Figure 2:
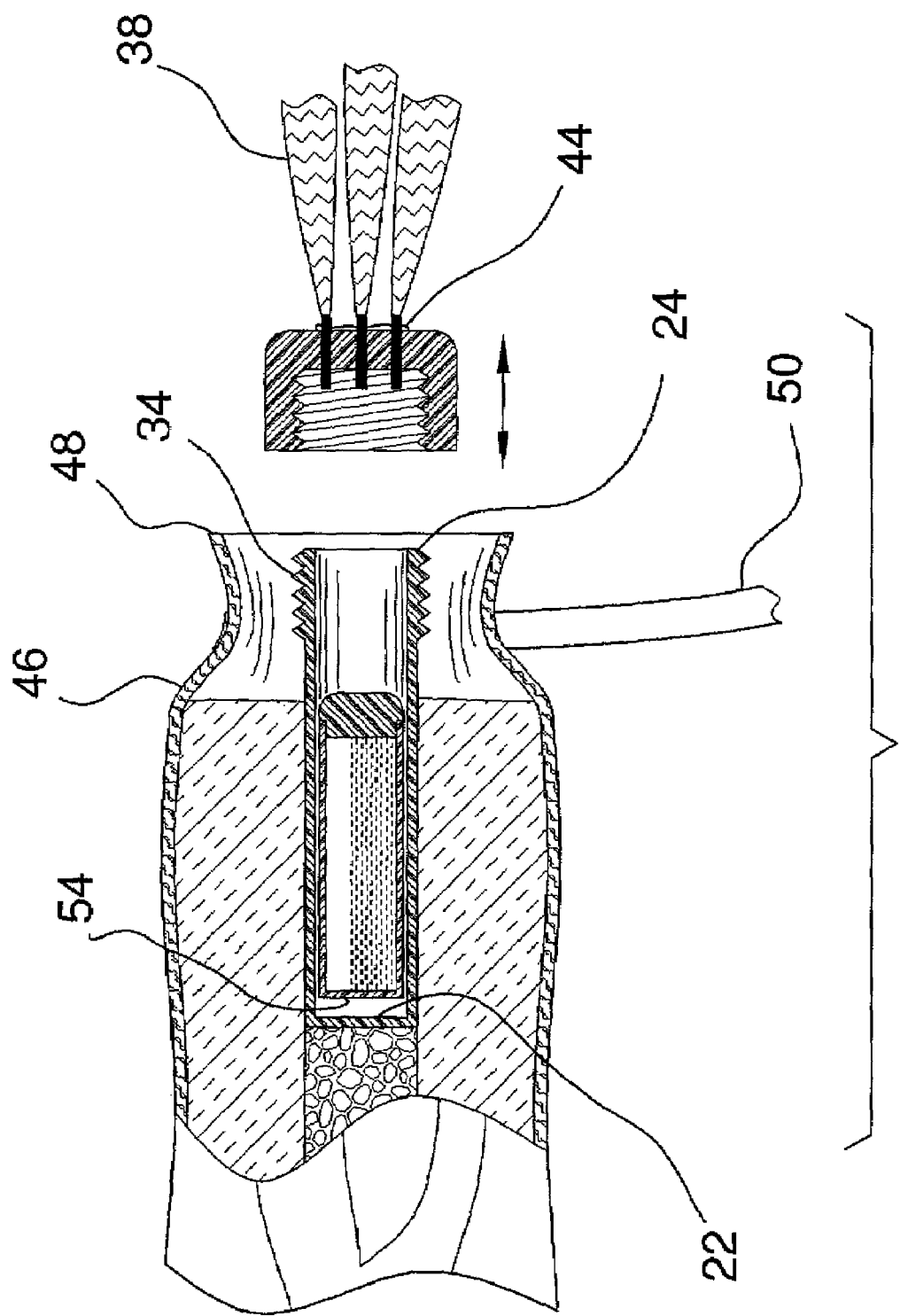
FIG. 2 is a cross-sectional view of the present invention.
Figure 3:
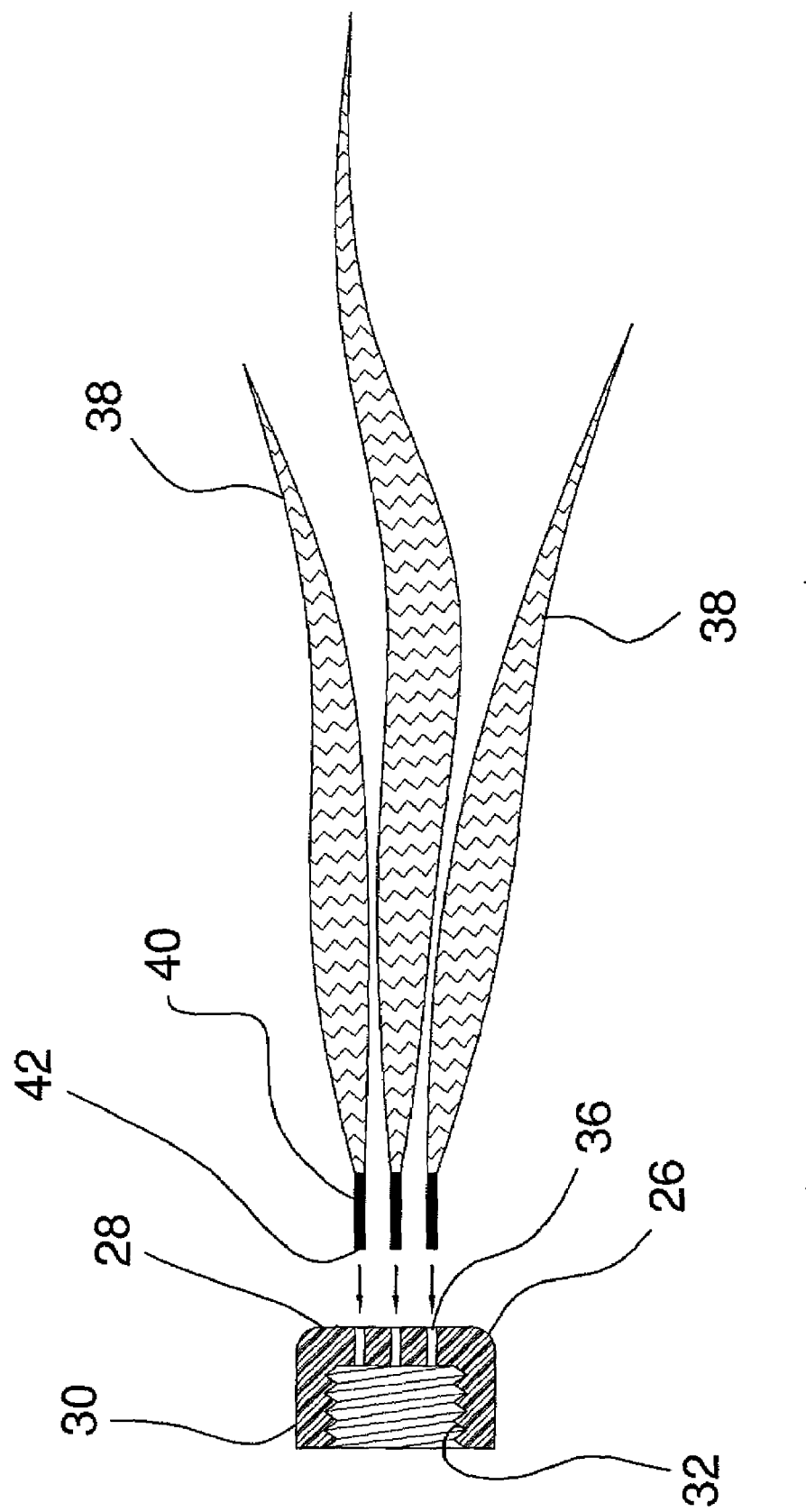
FIG. 3 is a side cross-sectional view of a cover of the present invention.
Figure 4:
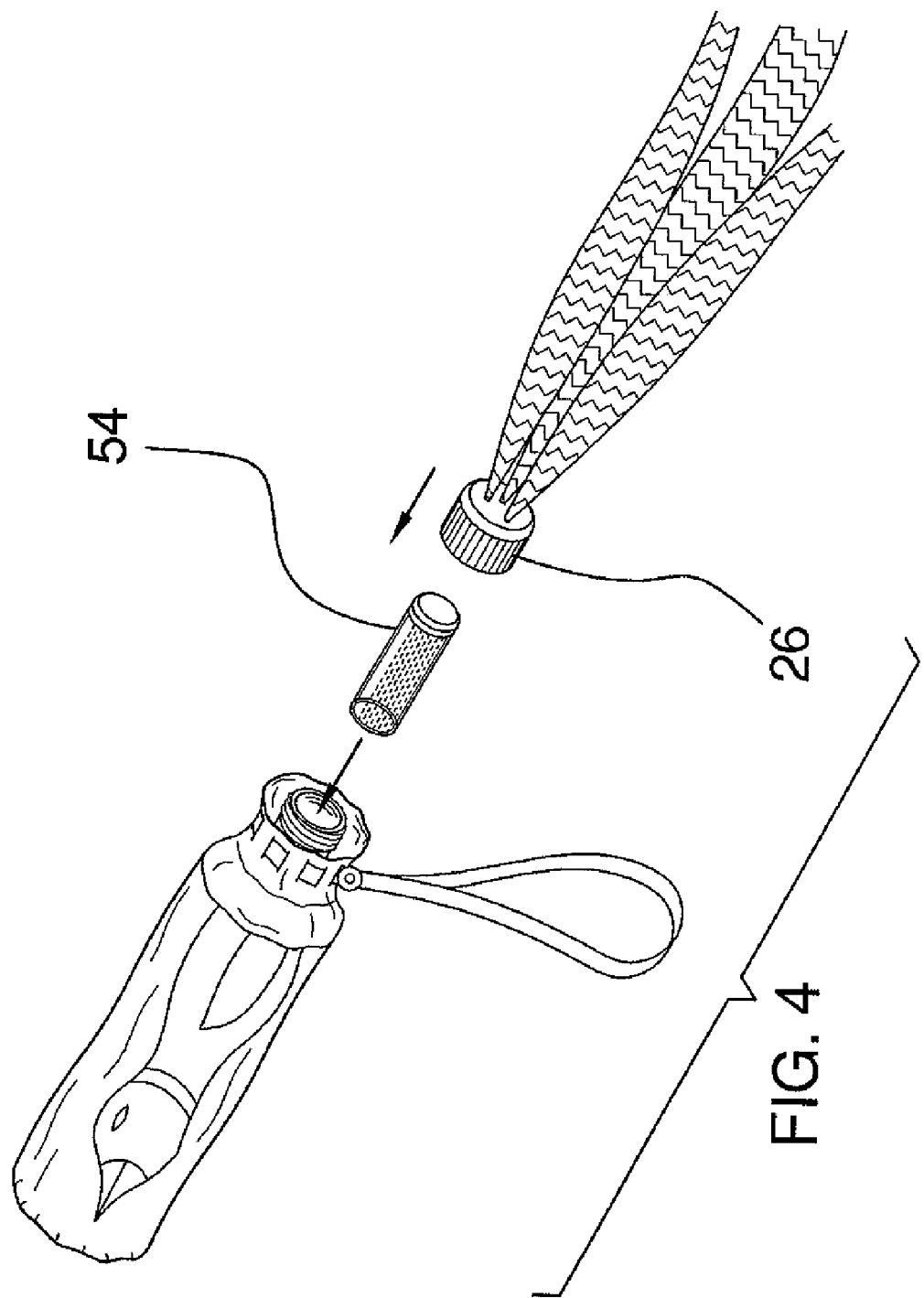
FIG. 4 is a perspective expanded view of the present invention.
Figure 5:
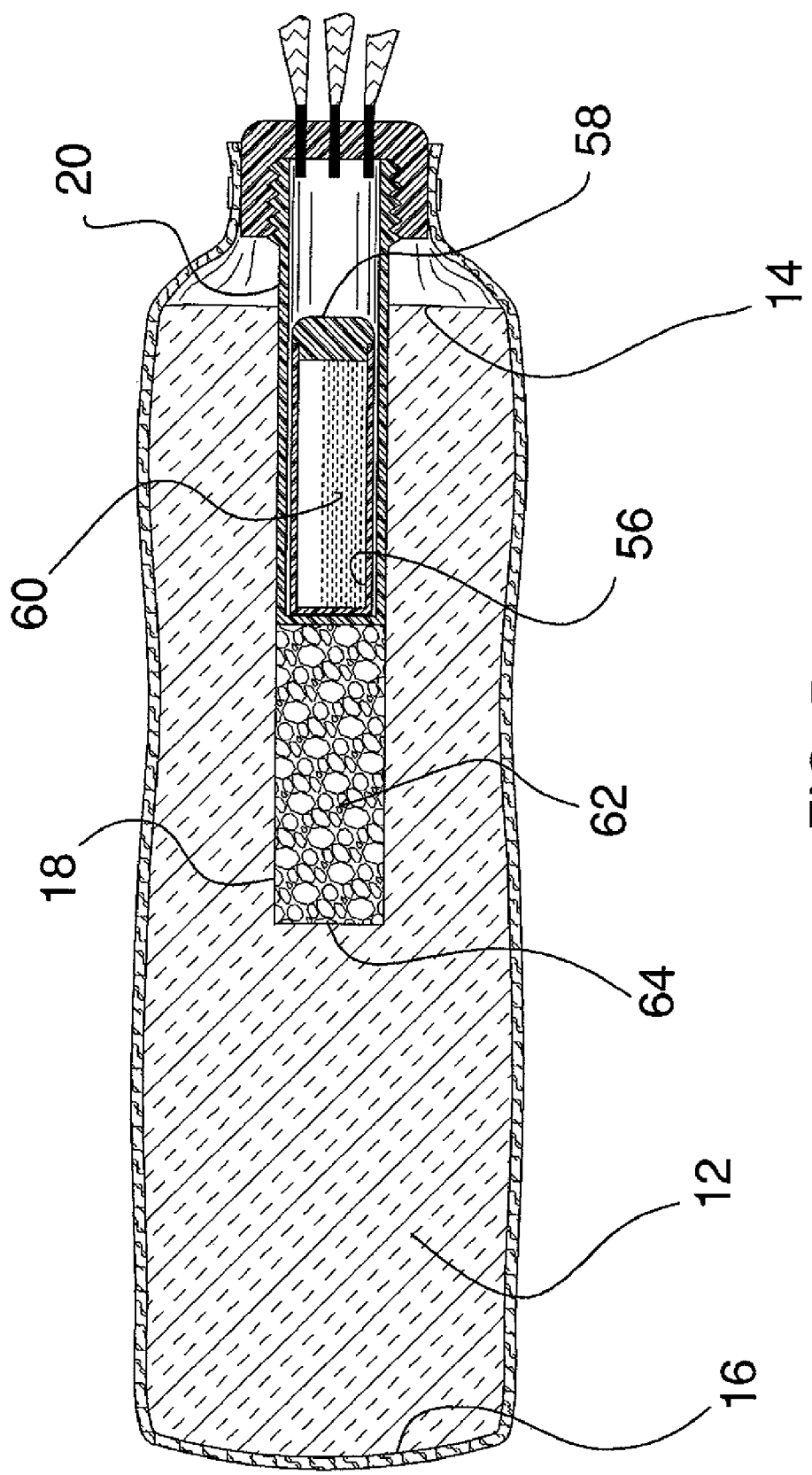
FIG. 5 is a cross-sectional view of the present invention.

With reference now to the drawings, and in particular to FIGS. 1 through 5 thereof, a new dog training device embodying the principles and concepts of the present invention and generally designated by the reference numeral 10 will be described.

As best illustrated in FIGS. 1 through 5, the method of making a dog training apparatus 10 and the apparatus thereof generally comprises providing a housing 12 that has a first end 14 and a second end 16. A well extends 18 into the first end 14 and toward the second end 16. The housing 12 comprises a foamed plastic material, such as Styrofoam, and may have an approximately cylindrical shape.

A sleeve 20 is mounted in and extends outwardly from the well 18. The sleeve 20 has a closed end 22 positioned within the well 18 and an open end 24 directed outwardly of the well 18. The sleeve 20 may be comprised of a plastic material though any rigid material may be used.

A cover 26 is removably positioned on and covers the open end 24 of the sleeve 20. The cover 26 includes an outer wall 28 and a peripheral wall 30 attached to the outer wall 28. An inner surface 32 of the peripheral wall 30 is threadably coupled to an outer surface 34 of the sleeve 20 adjacent the open end 24. The cover 26 has the size and shape of a conventional cap used for covering 2 liter soda bottles and the like to allow a user of the apparatus 10 to interchange the cover 26 with another cover as needed. The outer wall 28 therefore has a diameter between approximately 1 inch and 1¼ inches and the peripheral wall 30 has a height approximately equal to ½ inch. The outer wall 28 has a plurality of apertures 36 extending therethrough.

A plurality of feathers 38 is provided. The feathers 38 may be any type of feather but will generally be feathers from a game bird and more specifically feathers from a pheasant. Each of the feathers 38 includes a quill 40 having a free end 42. Each of the apertures 36 has one of the free ends 42 extending therethrough. The feathers 38 extend away from the sleeve 20 when the cover 26 is positioned on the sleeve 20. An adhesive 44, such as a liquid glue which is positioned on the cover or feathers, secures each of the quills 40 to the cover 26.

A casing 46 is provided which is positioned on and covers the housing 12. The casing 46 has an opening 48 therein. The feathers 38 extend outwardly through the opening 48. The casing 46 includes a tie 50 configured to allow selective cinching of the opening 48 and to assist a trainer using the apparatus 10 in throwing the apparatus 10. The casing 46 may be comprised of a cloth material, and in particular a synthetic cloth material. The casing may also have game bird indicia 52 thereon.

A container 54 has a size and shape configured to be removably positionable in the sleeve 20. The container 54 includes a body portion 56 and a cap 58 for sealing the body portion 56. A fluidic game scent 60 is positioned in the container 54. The game scent 60 may be matched to the feathers 38 used with the cover 26. The container 54 is placed in the sleeve 20 for storage purposes.

A weighting material 62 is provided to increase the weight of the housing 12 while keeping the exterior of the housing 12 resiliently compressible to be "soft" for a dog's mouth. The weighting material 62 is positioned in the well 18 between a rear wall 64 of the well 18 and the sleeve 20. The weighting material 62 may comprise any available weighting material that is positionable in the well 18, however the material 62 may in particular include sand or small pebbles.

In use, the housing 12, with the attached feathers 38, may be thrown and then chased, located and retrieved by a dog. The container 54 may be removed as needed to put scent 60 on the casing 46 and/or feathers 38 and then returned to the sleeve 20 so ensure that the scent 60 is always available to trainer of the dog. It is presumed that the dog will eventually irreparably damage the feathers 38 so that they are no longer useful. The trainer may then take a new cover 26, add new apertures 36 through the cover 26, and attached new feathers 38 to the new cover 26.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of constructing a dog training apparatus for training a dog to retrieve game, said method including the steps of:
    providing a housing having a first end and a second end, a well extending into said first end;
    providing a sleeve mounted in and extending outwardly from said well, said sleeve having a closed end positioned within said well and an open end directed outwardly of said well;
    providing a cover being removably positioned on and covering said open end of said sleeve, said cover including an outer wall and a peripheral wall attached to said outer wall, said outer wall having a plurality of apertures extending therethrough;
    providing a plurality of feathers, each of said feathers including a quill, each of said quills having a free end;
    extending each of said free ends through one of said apertures and each of said feathers extending away from said sleeve when said cover is positioned on said sleeve;
    providing a container, said container having a size and shape configured to be removably positionable in said sleeve;
    providing a fluidic game scent positioned in said container; and
    positioning said container in said sleeve.

2. The method according to claim 1, wherein the step of providing said housing includes said housing comprising a foamed plastic material.

3. The method according to claim 2, wherein the step of providing said housing includes said housing having a cylindrical shape.

4. The method according to claim 1, wherein the step of providing said cover includes an inner surface of said peripheral wall being threadably coupled to an outer surface of said sleeve.

5. The method according to claim 1, further including the step of providing an adhesive being positioned on and securing each of said quills to said cover.

6. The method according to claim 1, further including the step of providing a casing and positioning said casing over said housing, said casing having an opening therein, said feathers extending outwardly through said opening.

7. The method according to claim 1, further including the steps of providing a weighting material and positioning said weighting material in said well between a rear wall of said well and said sleeve.

8. A method of constructing a dog training apparatus for training a dog to retrieve game, said method including the steps of:
    providing a housing having a first end and a second end, a well extending into said first end, said housing comprising a foamed plastic material, said housing having a cylindrical shape;
    providing a sleeve mounted in and extending outwardly from said well, said sleeve having a closed end positioned within said well and an open end directed outwardly of said well;
    providing a cover being removably positioned on and covering said open end of said sleeve, said cover including an outer wall and a peripheral wall attached to said outer wall, an inner surface of said peripheral wall being threadably coupled to an outer surface of said sleeve, said outer wall having a plurality of apertures extending therethrough;
    providing a plurality of feathers, each of said feathers including a quill, each of said quills having a free end;
    extending each of said free ends through one of said apertures and each of said feathers extending away from said sleeve when said cover is positioned on said sleeve, an adhesive securing each of said quills to said cover;
    providing a casing;
    positioning said casing on and covering said housing, said casing having an opening therein, said feathers extending outwardly through said opening, said casing including a tie configured to allow selective cinching of said opening;
    providing a container, said container having a size and shape configured to be removably positionable in said sleeve;
    providing a fluidic game scent positioned in said container;
    positioning said container in said sleeve;
    providing a weighting material; and
    positioning said weighting material in said well between a rear wall of said well and said sleeve.

9. A dog training apparatus for training a dog to retrieve game, said apparatus comprising:

a housing having a first end and a second end, a well extending into said first end;

a sleeve being mounted in and extending outwardly from said well, said sleeve having a closed end positioned within said well and an open end directed outwardly of said well;

a cover being removably positioned on and covering said open end of said sleeve;

a plurality of feathers each being attached to said cover;

a container being removably positioned in said sleeve; and a fluidic game scent being positioned in said container.

10. The apparatus according to claim 9, wherein said housing comprises a foamed plastic material.

11. The apparatus according to claim 10, wherein said housing has a cylindrical shape.

12. The apparatus according to claim 11, wherein said cover includes an outer wall and a peripheral wall attached to said outer wall, an inner surface of said peripheral wall being threadably coupled to an outer surface of said sleeve.

13. The apparatus according to claim 12, wherein said outer wall has a plurality of apertures extending therethrough, each of said feathers including a quill, each of said quills having a free end, each of said free ends being extended through one of said apertures and each of said feathers extending away from said sleeve when said cover is positioned on said sleeve.

14. The apparatus according to claim 13, further including an adhesive secures each of said quills to said cover.

15. The apparatus according to claim 14, further including a casing positioned over said housing, said casing having an opening therein, said feathers extending outwardly through said opening, said casing including a tie configured to allow selective cinching of said opening.

16. The apparatus according to claim 15, further including a weighting material, said weighting material being positioned in said well between a rear wall of said well and said sleeve.

17. The apparatus according to claim 9, wherein said cover includes an outer wall and a peripheral wall attached to said outer wall, an inner surface of said peripheral wall being threadably coupled to an outer surface of said sleeve, said outer wall having a plurality of apertures extending therethrough, each of said feathers including a quill, each of said quills having a free end, each of said free ends being extended through one of said apertures and each of said feathers extending away from said sleeve when said cover is positioned on said sleeve.

18. The apparatus according to claim 17, further including an adhesive securing each of said quills to said cover.

19. The apparatus according to claim 18, further including a casing positioned over said housing, said casing having an opening therein, said feathers extending outwardly through said opening, said casing including a tie configured to allow selective cinching of said opening.

20. The apparatus according to claim 19, further including a weighting material, said weighting material being positioned in said well between a rear wall of said well and said sleeve.

* * * * *